Figure 1:
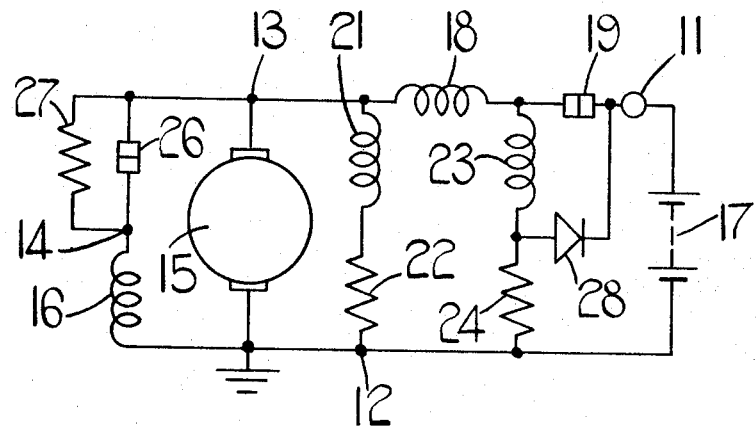

United States Patent [19]
Winkley et al.

[11] 3,794,904
[45] Feb. 26, 1974

[54] ELECTRO-MECHANICAL VOLTAGE REGULATORS WITH POLARITY PROTECTION FOR USE IN BATTERY CHARGING SYSTEMS ON ROAD VEHICLES

[76] Inventors: Albert William Winkley, Southall Cottage, Hadley, near Ombersley, Worcestershire; Wilson Hume Tannahill, 269 Ralph Rd., Shirley, Solihull, Warwickshire; Jeremy Peter Freeman, 37 Park Ave., Solihull, Warwickshire, all of England

[22] Filed: Feb. 18, 1972

[21] Appl. No.: 227,553

[30] Foreign Application Priority Data
Mar. 1, 1971  Great Britain..................... 5,676/71

[52] U.S. Cl.......................... 320/25, 320/61, 322/28
[51] Int. Cl. ............................................. H02j 7/14
[58] Field of Search........ 320/25, 26, 61, 64; 322/5, 322/28; 307/10 BP; 317/9 B

[56] References Cited
UNITED STATES PATENTS
2,781,486  2/1957  Gilchrist .............................. 322/28
3,307,097  2/1967  Brewster.............................. 320/25
3,398,347  8/1968  Citro.................................... 320/25

Primary Examiner—James D. Trammell
Assistant Examiner—Robert J. Rickey
Attorney, Agent, or Firm—Holman & Stern

[57] ABSTRACT

An electro-mechanical voltage regulator for a battery charging system on a road vehicle has regulator contacts in series with the field winding of a dynamo, and cut-out contacts for preventing the battery from discharging through the dynamo, the two sets of contacts being operated by windings. In such a regulator, means is incorporated for sensing incorrect connection of the battery and for reducing the regulated voltage if the battery is incorrectly connected so that the cut-out contacts are not closed by the cut-out winding, and cannot therefore be damaged.

3 Claims, 2 Drawing Figures

PATENTED FEB 26 1974  3,794,904

ELECTRO-MECHANICAL VOLTAGE REGULATORS WITH POLARITY PROTECTION FOR USE IN BATTERY CHARGING SYSTEMS ON ROAD VEHICLES

This invention relates to electro-mechanical voltage regulators for use in battery charging systems on road vehicles, of the kind including a battery terminal, an earth terminal, a dynamo terminal and a field terminal, the battery being connected in use between the battery and earth terminals, the dynamo being connected in use between the dynamo and earth terminals, and the field winding being connected in use between the field and earth terminals, a cut-out winding and a pair of normally open cut-out contacts interconnecting the dynamo and battery terminals, a voltage winding connected in series with a resistor between the junction of the cut-out winding and cut-out contacts and the earth terminal, and a pair of normally closed contacts operable by the voltage winding and connected between the dynamo terminal and the field terminal.

The invention resides in a regulator of the kind specified, including means operable when the battery is incorrectly connected for reducing the regulated voltage to a value such that the cut-out contacts are not closed by the cut-out winding.

Preferably, said means is connected between the battery terminal and the junction of the voltage winding and resistor. The means may be a diode, or alternatively a clipper diode, in which case protection is also afforded against incorrect connection of the dynamo.

Figure 2:
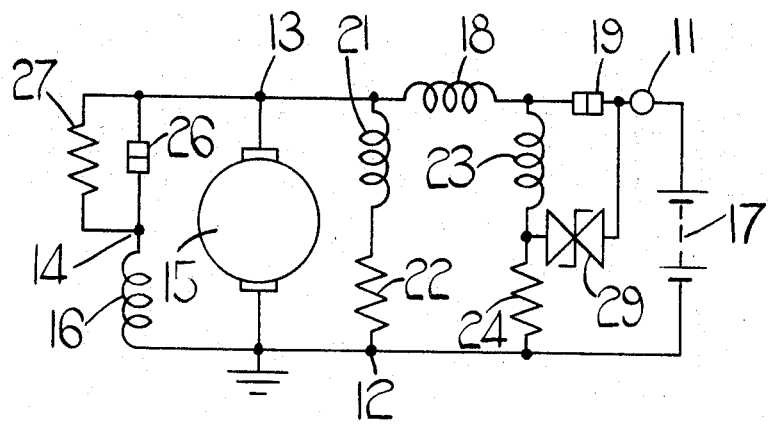

In the accompanying drawings, FIGS. 1 and 2 are circuit diagrams illustrating two examples of the invention.

Referring to FIG. 1, the regulator includes a battery terminal 11, an earth terminal 12, a dynamo terminal 13 and a field terminal 14. The regulator is intended to be used in the battery charging system having a shunt-wound dynamo, the armature 15 of which is connected between the terminals 13, 12 and the field winding 16 of which is connected between the terminals 14, 12, the battery of the vehicle being connected between the terminals 11, 12 with its positive terminal coupled to the terminal 11.

The terminals 13, 11 are interconnected by a series circuit including a series cut-out winding 18 and a pair of normally open cut-out contacts 19. The contacts 19 are controlled by the winding 18 and a further winding 21 which is connected in series with a resistor 22 between the terminals 13, 12 in the usual way. Moreover, the junction of the winding 18 and contacts 19 is connected to the terminal 12 through a voltage winding 23 and a resistor 24 in series, the winding 23 serving when energised to open a pair of normally closed contacts 26 connected between the terminals 13, 14 and bridged by a resistor 27.

The arrangement thus far described is conventional, the winding 23 serving to open the contacts 26 when the dynamo output voltage exceeds a predetermined value, so that field current is then limited by the resistor 27. The cut-out winding 21 closes the contacts 19 when the dynamo 15 is charging the battery 17, and the winding 18 in conjunction with the winding 21 prevents the battery 17 from discharging into the dynamo 15 by opening the contacts 19.

With such an arrangement, if the battery 17 is incorrectly connected, it is found that the contacts 19 can become welded together. In order to overcome this difficulty, a diode 28 is connected with its anode coupled to the junction of the winding 23 and resistor 24 and its cathode connected to the terminal 11. With the battery correctly connected as shown, the diode 28 does not conduct. However, if the battery 17 is connected the wrong way round, then the diode 28 conducts and a bias voltage is applied to the junction of the winding 23 and resistor 24, with the result that the dynamo armature voltage required to operate the regulator is reduced to a value such that the winding 21 will not close the contacts 19.

In the example shown in FIG. 2, the same reference numerals have been employed for the same components. The circuit is identical except that a clipper diode 29 is employed in place of the diode 28. The arrangement is such that normally the clipper diode 29 does not conduct, but if either the battery 17 or the dynamo 15 is incorrectly connected, then when the generator 15 produces an output, rise in the generator voltage increases the voltage difference between the terminal 11 and the junction of the winding 23 and resistor 24 until the clipper diode 29 conducts, at which point the voltage difference is retained at this value by the clipper diode 29. The arrangement is such that, as in FIG. 1, the contacts 19 do not close and so no damage results.

In a modification, the upper connection of the winding 21 in both FIG. 1 and FIG. 2 is at the right hand side of the winding 18, so that the connection between the winding 21 and the terminal 13 is through the winding 18. This modification does not alter the operation of the arrangements shown in the two drawings.

We claim:

1. An electro-mechanical voltage regulator for use in battery charging systems on road vehicles, of the kind including a battery terminal, an earth terminal, a dynamo terminal and a field terminal, the battery being connected in use between the battery and earth terminals, the dynamo being connected in use between the dynamo and earth terminals, and the field winding being connected in use between the field and earth terminals, a cut-out winding and a pair of normally open cut-out contacts interconnecting the dynamo and battery terminals, a voltage winding connected in series with a resistor between the junction of the cut-out contacts and the earth terminal, and a pair of normally closed contacts operable by the voltage winding and connected between the dynamo terminal and the field terminal, said regulator further including means connected between the battery terminal and the junction of the voltage winding and regulator and which when the battery is correctly connected plays no part in the operation of the regulator, said means being operable when the battery is incorrectly connected for reducing the regulated voltage to a value such that the cut-out contacts are not closed by the cut-out winding.

2. A regulator as claimed in claim 1 in which said means is a diode.

3. A regulator as claimed in claim 1 in which said means is a clipper diode.

* * * * *